United States Patent [19]

Harvey et al.

[11] Patent Number: 4,951,072
[45] Date of Patent: Aug. 21, 1990

[54] UNIVERSAL MOUNT FOR A SPECIMEN HOLDER

[76] Inventors: James C. Harvey, P.O. Box 100486, Ft. Worth, Tex. 76185; Bruce J. Russell, Box 457, Loomis, Calif. 95650

[21] Appl. No.: 408,204
[22] Filed: Sep. 18, 1989
[51] Int. Cl.[5] .............................................. G03B 29/00
[52] U.S. Cl. ...................................... 354/80; 354/292
[58] Field of Search ................. 354/80, 290, 291, 292, 354/295, 296; 355/18, 21, 39, 64, 125

[56] References Cited

U.S. PATENT DOCUMENTS 567,496  9/1896  Naef ..................................... 354/296
4,283,135  8/1981  Lupis ................................. 354/80 X

*Primary Examiner*—Brian W. Brown
*Attorney, Agent, or Firm*—Roger A. Marrs

[57] ABSTRACT

A universal mount is disclosed herein for positioning small subjects for macro-photography which includes a box-like base having a releasable fastener for detachably coupling with a tripod mount of a conventional camera so as to downwardly depend therefrom. A fixed barrel tube outwardly projects in a cantilevered fashion from the side of the base and includes bearings for slidably and rotatably receiving an elongated focus tube arranged in coaxial and telescoping relationship therewith. A rod holder is carried on the free end of the focus tube having an axis normal to the central longitudinal axis of the focus tube for slidably supporting a specimen holder such as a clip or transparent box.

2 Claims, 1 Drawing Sheet

U.S. Patent
Aug. 21, 1990
4,951,072
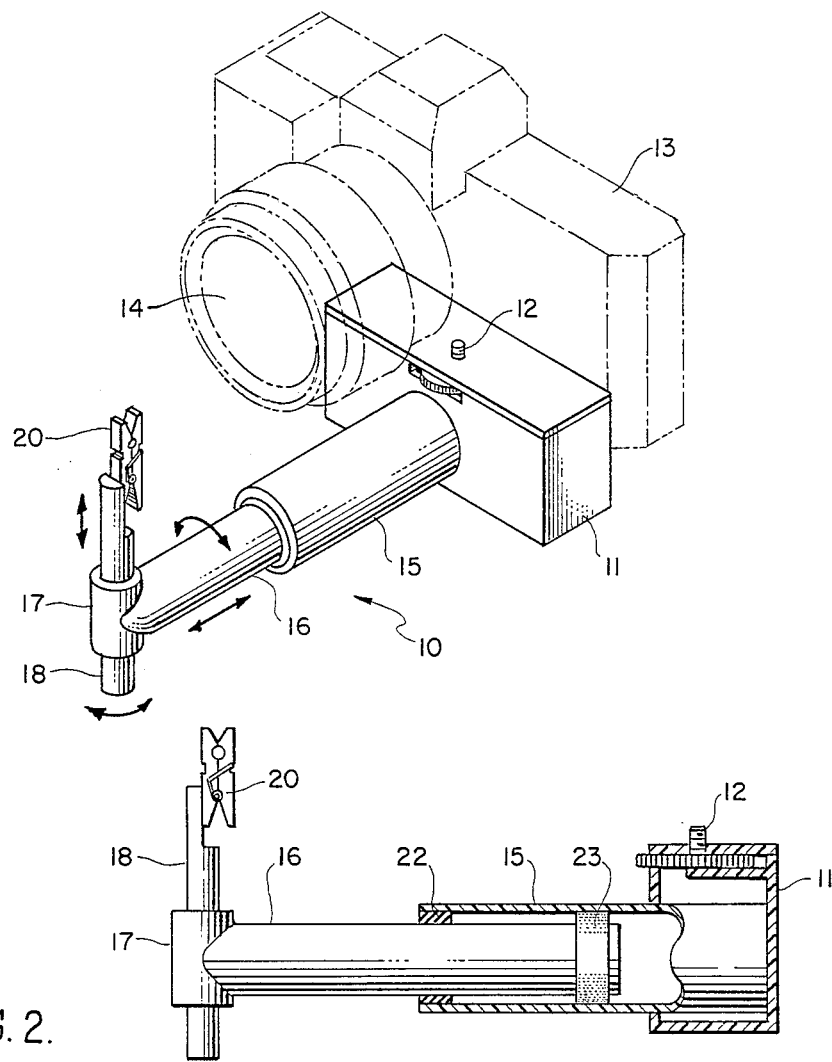
FIG. 1.
FIG. 2.
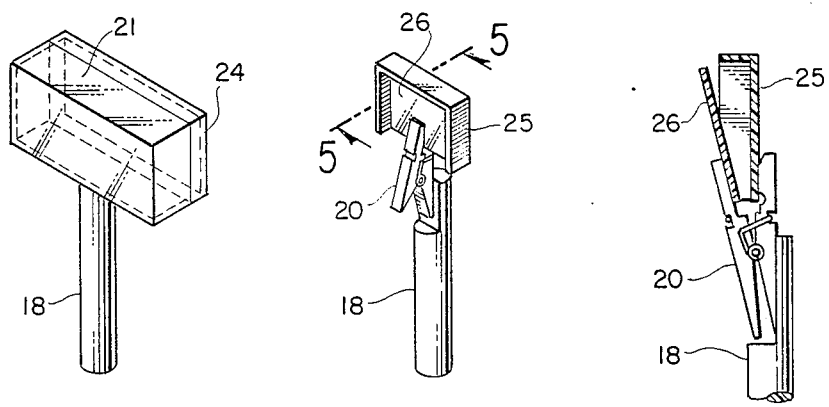
FIG. 3.  FIG. 4.  FIG. 5.

UNIVERSAL MOUNT FOR A SPECIMEN HOLDER

BACKGROUND OF THE INVENTION

1. Field of the invention

The present invention relates to utility holders and more particularly to a novel specimen holder that is readily positionable in connection with a camera lens useful in macro-photography incorporating a universal means for adjusting the specimen with regard to focus, side-position and elevation.

2. Brief Description of the Prior Art

Although cameras have been employed for taking the picture of small specimen objects or subjects, it has been difficult to hold the subject or object in a proper position along the focal plane of the magnifying lens in the camera so that a proper picture can be taken. Usually, the camera is placed on a tripod for stability and held in a fixed position with respect to the subject or the object during the taking of the picture. However, when pictures of subjects or objects are needed in macro-photography, it is difficult to maintain the subject or object in position even though the camera is fixedly disposed on a tripod.

Furthermore, under such circumstances, it is necessary that the lens of the camera be placed very close to the specimen object being photographed and that the specimen subject be kept at the proper focal distance from the lens during the time that the picture is being taken.

Therefore, a long standing need has existed to provide a novel means for supporting or holding a specimen object or subject which may be readily adjusted by up and down movement as well as side-by-side movement and additionally by rotary movement so that the specimen subject or object may be properly placed with respect to the lens of a camera. In order to arrange such a means, the mounting means should be carried on the camera itself and should include cantilevered components which extend forward of the camera lens where azimuth and elevation adjustments can be made.

SUMMARY OF THE INVENTION

Accordingly, the above problems and difficulties are obviated by the present invention which provides a novel holding device which is releasably mounted to the underside of a conventional camera so that cantilevered components extend forwardly from one side of the holder to extend forwardly of the camera lens. Movable means, such as telescoping tubular members, are employed for carrying a specimen holder that may be moved up and down relative to the telescoping members. Clip means or transparent box means may be carried on the holder at the end of the cantilevered and telescoping members for retaining the specimen subject or object to be photographed.

A feature of the invention resides in the fact that bearing means are provided between the telescoping members to permit rotation of the members with respect to each other during adjustment and the invention is further characterized as providing means for moving the clip or box holder up and down relative to the camera lens for additional adjustment purposes. In essence, the mounting of the specimen is by virtue of a universal joint means permitting adjustment about a rotary axis, to be elevated in a vertical plane and to be moved sideways in a horizontal plane.

Therefore, it is among the primary objects of the present invention to provide a novel mounting device for specimen objects and subjects that may be positionable about the focal plane of the camera lens that is useful for macro-photography.

Another object of the present invention is to provide a novel mount which is releasably attached to the underside of a camera having cantilevered means forwardly supporting a specimen holder that may be universally adjusted about the focal plane of the camera lens for use in macro-photography.

Yet another object of the present invention is to provide a simple and inexpensive specimen holder that may readily be mounted to a camera so that a universal adjustment is provided for aligning a specimen subject or object along the focal plane or optical axis of a camera lens.

Still a further object of the present invention is to provide a truly portable mounting means which is detachably carried on a conventional camera so that a holder for a specimen object or subject may be adjusted along the optical axis of the camera lens employing components characterized as providing a universal joint movement involving rotary movement about a longitudinal axis as well as vertical movement relative thereto and sideways movement with respect thereto.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front perspective view showing the novel universal mount for a specimen holder incorporating the present invention;

FIG. 2 is a side elevational view, partly in section, of the novel universal mount for a specimen holder shown in FIG. 1;

FIGS. 3, 4 and 5 are perspective views showing a variety of specimen holders that may be used on the end of the movable telescoping member in the universal mount shown in FIGS. 1 and 2.

DESCRIPTION OF THE PREFERRED EMBODIMENT

Referring to FIG. 1, the novel universal mount for a specimen holder is indicated in the general direction of arrow 10 which includes an elongated, box-like base 11 having a thumbscrew means 12 adapted to be releasably coupled with a tripod mount carried on the underside of a conventional camera, indicated by numeral 13. The camera 13 includes a lens 14 having an optical axis on which an object or specimen intended to be photographed is placed. In order to properly position the object or subject on the optical axis, the base 11 further includes a fixed barrel 15 that outwardly extends from the front of the base forwardly of the camera 13 in a cantilevered fashion. The barrel tube 15 slidably mounts a focus tube 16 in telescoping relationship so that the focus tube may be moved towards or away from the camera 13 during adjustment. The free end of the focus tube 16 is fixed with a specimen rod holder barrel 17 which includes a central bore having open ends into which a specimen holder rod 18 is slidably disposed.

The end of the rod 18 is illustrated as carrying a specimen holder taking the form of a spring clip 20 which is suitable for holding a specimen on the optical axis of the camera lens 14 after adjustment.

The rod holder 18 may be employed to support one of several specimen or subject holders, such as the spring clip 20, a transparent box 21, as shown in FIG. 3, a combination of spring clip and transparent box, as shown in FIG. 4, and as further indicated in FIG. 5.

As shown more clearly in FIG. 2, the telescoping members 15 and 16 constituting the fixed barrel and the movable focus tube are arranged in coaxial relationship with respect to one another and are supported on bearings 22 and 23 so as to permit movement of the focus tube with respect to the fixed barrel. The tube and barrel are arranged in telescoping relationship so that the focus tube 16 may be extended outwardly from the fixed barrel 15 to a desired distance. Also, it is to be understood that similar journal bearings are provided within the open bore of rod holder barrel 17 so that the rod 18 may readily move therethrough through a desired or adjusted position.

As shown more clearly in FIG. 3, the specimen holder rod 18 is smooth on its external surface so as to slide within the bore of the holder barrel 17 while carrying a box 21 composed of transparent material on its extreme end. The box 21 includes a removable cover or lid 24 adapted to snap onto or off of the sidewalls of the box to permit storing of a specimen within the box or the removal thereof.

FIGS. 4 and 5 show an alternate specimen holder wherein the specimen is retained in a fixed position within a box 25 composed of transparent material. In this latter instance, a clip similar to the clip 20 is carried on the end of the rod 18 with the box 25 being secured to one side of the clip element. The other side of the clip element carries a transparent plate 26 which is moved into or out of the box 25 from one side thereof. This relationship is more clearly shown in FIG. 5 when the spring clip 20 is compressed to permit the transparent panel 26 to be moved out of the cavity of box 25. This permits an object or subject to be introduced into the cavity or to be released therefrom.

In any event, the object, be it held in the box or by the clip, is intended to be adjusted by means of the focus tube and the rod 18 so that the object will lie on the optical axis and within focus of the camera lens 14. Therefore, it is important that the upper side of the base 11 be mateable with the underside of the conventional camera 13 whereby the central longitudinal axis of the focus tube and fixed barrel will be parallel to the optical axis of the camera. Such a parallel relationship will be established upon assembly of the universal holder of the present invention with the conventional camera 13. Once assembled, the focus tube may be either rotated or moved in and out of the barrel 15 to place the object in proper focus. The holder rod 18 may be either rotated or moved through the bore of the barrel 17 to further adjust positioning of the object or subject on the optical axis. Thereby, the specimen holder barrel as well as holder rod allows photographic subjects to be rotated and positioned by gripping the specimen holder rod where it extends below the barrel 17. Also, it is to be understood that the transparent box 21 may be of watertight construction so that aqueous subject matter can be examined and photographed.

In the practice of the present invention utilizing the combination of movements (in-out, up-down, side-to-side, and rotation around the central vertical axis) it allows the photographic subject, such as a flower, insect, gem, microscopic slide, etc. to be positioned in exactly the proper orientation desired. The subject is held steady and positioned in the most advantageous lighting angles for photography and videography. This is totally achieved from the "hand-held" position allowing one-handed orientation and focusing of the subject while the other hand is free to operate camera controls. Because specimen and camera are locked together as one unit, steadiness of the photographic image is ensured while the photographer retains full freedom of movement so as to allow the photographer to change lighting and background at will.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A universal mount for use in combination with a hand-held camera comprising:

a camera having a case and a horizontal optical axis;

an elongated base housing having opposite ends;

a screw fastener operably carried on said base housing for releasably securing said base housing to said camera case;

telescoping means having an overall length outwardly extending from a selected side of said base housing mid-way between its opposite ends in a cantilevered manner;

said telescoping means comprising a pair of coaxially disposed tubes in sliding relationship wherein one tube is an outer tube fixed at one end to said base housing, and the other end of said outer tube projected outwardly from said base housing in fixed spaced-apart relationship and the other tube of said pair is an inner tube having a first end arranged in sliding relationship with said one tube of said pair and a second end constituting a free end in movable disposition with respect to said base housing;

a movable rod carried on said free end of said telescoping means other tube adjustable normal towards and away from said camera horizontal optical axis;

holder means carried on a selected end of said rod for releasably holding a subject intended to be photographed;

said telescoping means includes a central longitudinal axis in parallel spaced-apart relationship with respect to said camera horizontal optical axis;

said telescoping means inner tube includes a fixed barrel outwardly projecting from said base housing and said outer tube constituting a movable focus tube extending from and carried by said fixed barrel so as to adjustably extend and shorten the overall length of said telescoping means;

said focus tube mounts in friction bearings carried by said fixed barrel;

an open-ended barrel carried on said free end of said outer focus tube having a central axis normal to the central longitudinal axis of said telescoping means and said camera optical axis;

said movable rod slidably and rotatably carried on said open-ended barrel wherein said holder means is adapted to move towards and away from said camera optical axis as well as rotate about said camera optical axis as well as back and forth along said camera optical axis;

said holder means includes a manual clip carried on said selected end of said rod adjacent to camera optical axis.

2. The invention as defined in claim 1 including:
a transparent box removably carried on said manual clip.

* * * * *